(No Model.)
G. THANE.
SULKY PLOW.
No. 601,600. Patented Mar. 29, 1898.
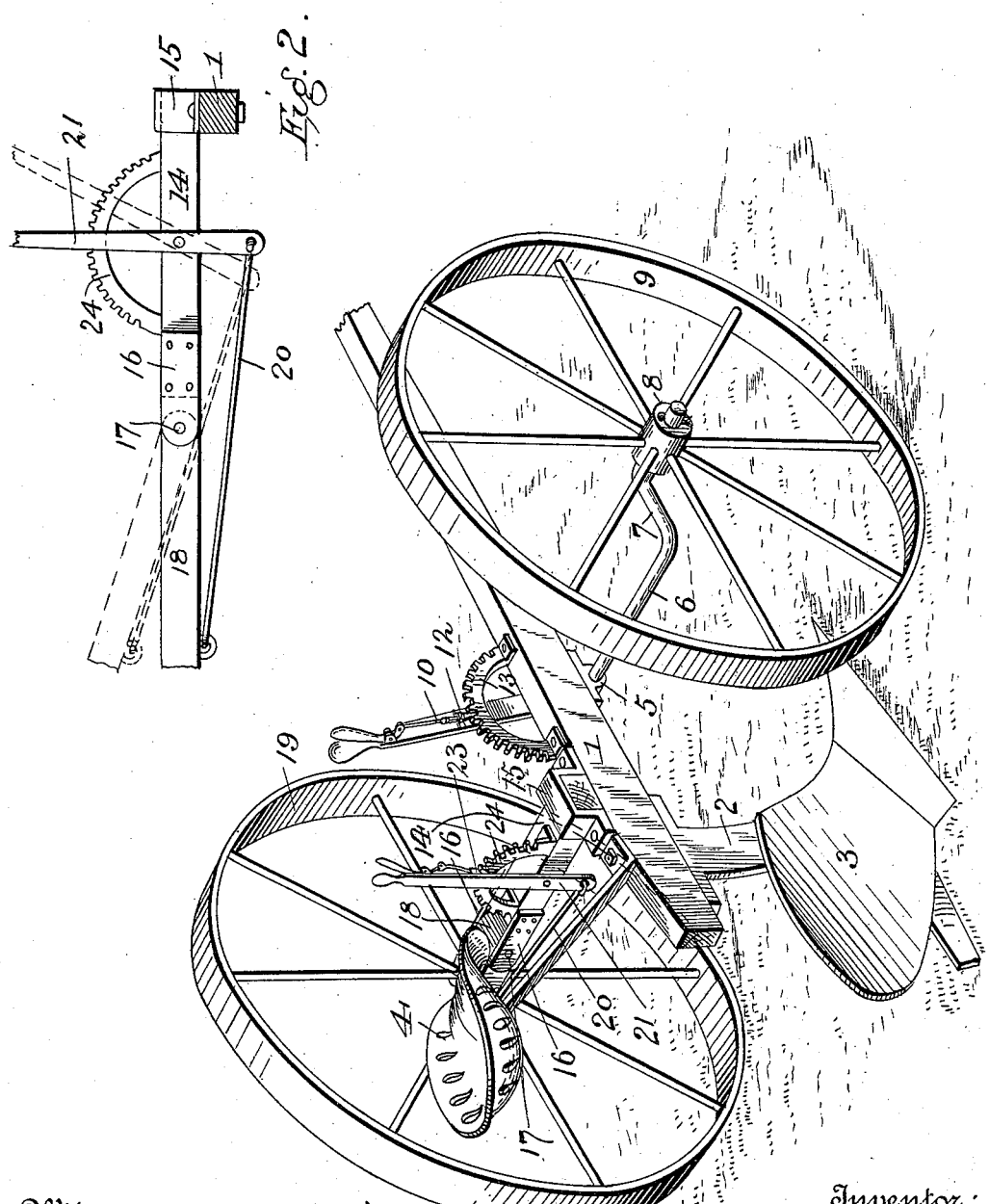
Witnesses:
Franck L. Ourand
Inventor:
George Thane
Louis Bagger & Co.
Attorneys

UNITED STATES PATENT OFFICE.

GEORGE THANE, OF MOUNT VERNON, MISSOURI.

SULKY-PLOW.

SPECIFICATION forming part of Letters Patent No. 601,600, dated March 29, 1898.

Application filed October 25, 1897. Serial No. 656,367. (No model.)

*To all whom it may concern:*

Be it known that I, GEORGE THANE, a citizen of the United States, and a resident of Mount Vernon, in the county of Lawrence and State of Missouri, have invented certain new and useful Improvements in Sulky-Plows; and I do hereby declare that the following is a full, clear, and exact description of the invention, which will enable others skilled in the art to which it appertains to make and use the same, reference being had to the accompanying drawings, which form a part of this specification.

My invention relates to sulky-plows; and its object is to provide an improved construction of the same which shall possess superior advantages with respect to efficiency in operation.

The invention consists in the novel construction and combination of parts hereinafter fully described and claimed.

In the accompanying drawings, Figure 1 is a perspective view of a sulky-plow constructed in accordance with my invention. Fig. 2 is a detail view.

In the said drawings the reference-numeral 1 designates the plow-beam, 2 the standard, 3 the share, and 4 the seat, all of which may be of any ordinary or suitable construction. Secured to the beam by clamps 5 is a rotatable axle 6, having its outer end bent at a right angle, forming an arm 7, and then extended laterally outward, forming a spindle 8, upon which is mounted a wheel 9, which travels in the furrow. At its inner end said axle is provided with a lever 10, having a pawl 12, which engages with a segment-rack 13, secured to the plow-beam so as to hold the axle in any position to which it may be adjusted.

The numeral 14 designates the inner end of a sectional axle, secured to the beam by means of clamps 15. This portion is provided with plates 16, to which is pivoted, by means of a pivot 17, the outer section 18, provided with a wheel 19. Connected with this outer section is a rod 20, also connected with a lever 21, pivoted to the inner section and provided with a pawl 23, which engages with a segment-rack 24, secured to said inner section.

In operation the wheel 9 travels in the furrow, while the wheel 19 travels on the unplowed ground. By means of the lever 10 the axle 6 can be turned or rotated, so as to raise or lower the wheel 9 to accommodate it to different levels. The outer section 18 of the sectional or two-part axle can also be adjusted to suit different levels by means of the lever 21.

By the above construction the plow is always held properly to its work, insuring efficiency in operation.

The improvements may be readily applied to the ordinary hand-planters now in common use.

Having thus described the invention, what I claim as new is—

In a sulky-plow, the combination with the beam, the rotatable bent axle, the wheel and means for holding said axle in its adjusted position, of the sectional axle, the inner portion of which is secured to the beam and the outer section pivoted to said inner section, the wheel, the rod connected with said outer section, the lever to which said rod is connected pivoted to the said inner section, and means for holding said lever in its adjusted position, substantially as described.

In testimony that I claim the foregoing as my own I have hereunto affixed my signature in presence of witnesses.

GEORGE THANE.

Witnesses:
JOHN C. TURK,
WM. BORTELSMEYSER,
WILLIAM R. HAREN.